(12) United States Patent
Coburn et al.

(10) Patent No.: US 10,389,603 B2
(45) Date of Patent: Aug. 20, 2019

(54) FAST PROVISIONING OF TENANTS ON A HOSTED SERVICE

(71) Applicant: Microsoft Technology Licensing, LLC, Redmond, WA (US)

(72) Inventors: Mark David Coburn, Bothell, WA (US); Narayana Mahankali, Woodinville, WA (US); Suraj Gaurav, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 148 days.

(21) Appl. No.: 15/612,481

(22) Filed: Jun. 2, 2017

(65) Prior Publication Data
US 2018/0351832 A1 Dec. 6, 2018

(51) Int. Cl.
*G06F 15/177* (2006.01)
*H04L 12/24* (2006.01)
*H04L 29/08* (2006.01)

(52) U.S. Cl.
CPC ........ *H04L 41/5048* (2013.01); *H04L 41/046* (2013.01); *H04L 41/0668* (2013.01); *H04L 41/0806* (2013.01); *H04L 41/5093* (2013.01); *H04L 67/1023* (2013.01); *H04L 67/1095* (2013.01)

(58) Field of Classification Search
CPC ............. H04L 40/5048; H04L 41/5093; H04L 67/1095; H04L 67/1023
USPC ....................................................... 709/221
See application file for complete search history.

(56) References Cited

U.S. PATENT DOCUMENTS

| 9,436,509 | B2 | 9/2016 | McLean et al. |
| 9,467,355 | B2 | 10/2016 | Doering et al. |
| 2014/0173594 | A1 | 6/2014 | Ng et al. |
| 2014/0280975 | A1 | 9/2014 | Mordani et al. |
| 2015/0106805 | A1 | 4/2015 | Melander et al. |
| 2015/0363724 | A1 | 12/2015 | Chatterjee et al. |
| 2016/0043967 | A1 | 2/2016 | Jacob et al. |

(Continued)

FOREIGN PATENT DOCUMENTS

| WO | 2014007813 A1 | 1/2014 |
| WO | 2014039918 A1 | 3/2014 |

(Continued)

OTHER PUBLICATIONS

"AWS : Choosing a Cloud Platform", https://aws.amazon.com/choosing-a-cloud-platform/, Published on: May 16, 2013, 37 pages.

*Primary Examiner* — Frantz B Jean
(74) *Attorney, Agent, or Firm* — Christopher J. Volkmann; Kelly, Holt & Christenson, PLLC

(57) ABSTRACT

A set of partial tenant objects are created within a hosted service. The set of partial tenant objects have placeholders for tenant identifiers, domain identifiers and user identifiers. Upon receiving a request to provision a tenant, a particular partition of the hosted service, corresponding to the tenant, is identified and a provisioning agent in the identified partition is called to provision the tenant. The provisioning agent selects one of the partial tenant objects which is bound to tenant-specific information, such as a specific tenant identifier, custom domain chosen by the tenant, and a user identifier input by the tenant.

20 Claims, 11 Drawing Sheets

(56) References Cited

U.S. PATENT DOCUMENTS

2016/0094624 A1* 3/2016 Mordani ............... H04L 47/76
                                                                         709/203
2016/0231998 A1* 8/2016 Islam ..................... G06F 8/65
2018/0349631 A1* 12/2018 Illendula ............... G06F 15/16

FOREIGN PATENT DOCUMENTS

| WO | 2015191119 A1 | 12/2015 |
|----|---------------|---------|
| WO | 2016049578 A1 | 3/2016 |

\* cited by examiner

FAST PROVISIONING OF TENANTS ON A HOSTED SERVICE

BACKGROUND

Computing systems are currently in wide use. Some computing systems are systems which host services for one or more different tenants. The tenants can be organizations that have one or more different users.

The hosted services can take many forms. For instance, they can be hosted electronic mail (e-mail) services, document management and sharing services, calendar systems, among a wide variety of other services. When a tenant wishes to open a new account or subscribe to the service, the tenant is provisioned (or created within, and granted access to) the service. For instance, when a tenant wishes to have access to a hosted electronic mail service, the tenant acquires an account, and provides a custom domain name and custom user identification information identifying the users that will have mailboxes on the tenant's domain, in the e-mail service. This information is used to provision a tenant in the email system.

In some current systems, when a tenant is provisioned, after the tenant provides the tenant, domain and user information, a tenant object is created within the hosted service. For instance, a tenant object representing tenant attributes that identify the particular tenant, domain and user, is created within the e-mail system. One or more mailboxes are created within the e-mail system, corresponding to the tenant object. One or more users are also bound to the one or more mailboxes, so that the users of the tenant can use the hosted e-mail service.

Provisioning a tenant (creating the mailbox with the tenant-specific domain, and assigning a user to the mailbox) can be a relatively long latency operation.

The discussion above is merely provided for general background information and is not intended to be used as an aid in determining the scope of the claimed subject matter.

SUMMARY

A set of partial tenant objects are created within a hosted service. The set of partial tenant objects have placeholders for tenant identifiers, domain identifiers and user identifiers. Upon receiving a request to provision a tenant, a particular partition of the hosted service, corresponding to the tenant, is identified and a provisioning agent in the identified partition is called to provision the tenant. The provisioning agent selects one of the partial tenant objects which is then bound to tenant-specific information, such as a specific tenant identifier, custom domain chosen by the tenant, and a user identifier input by the tenant.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
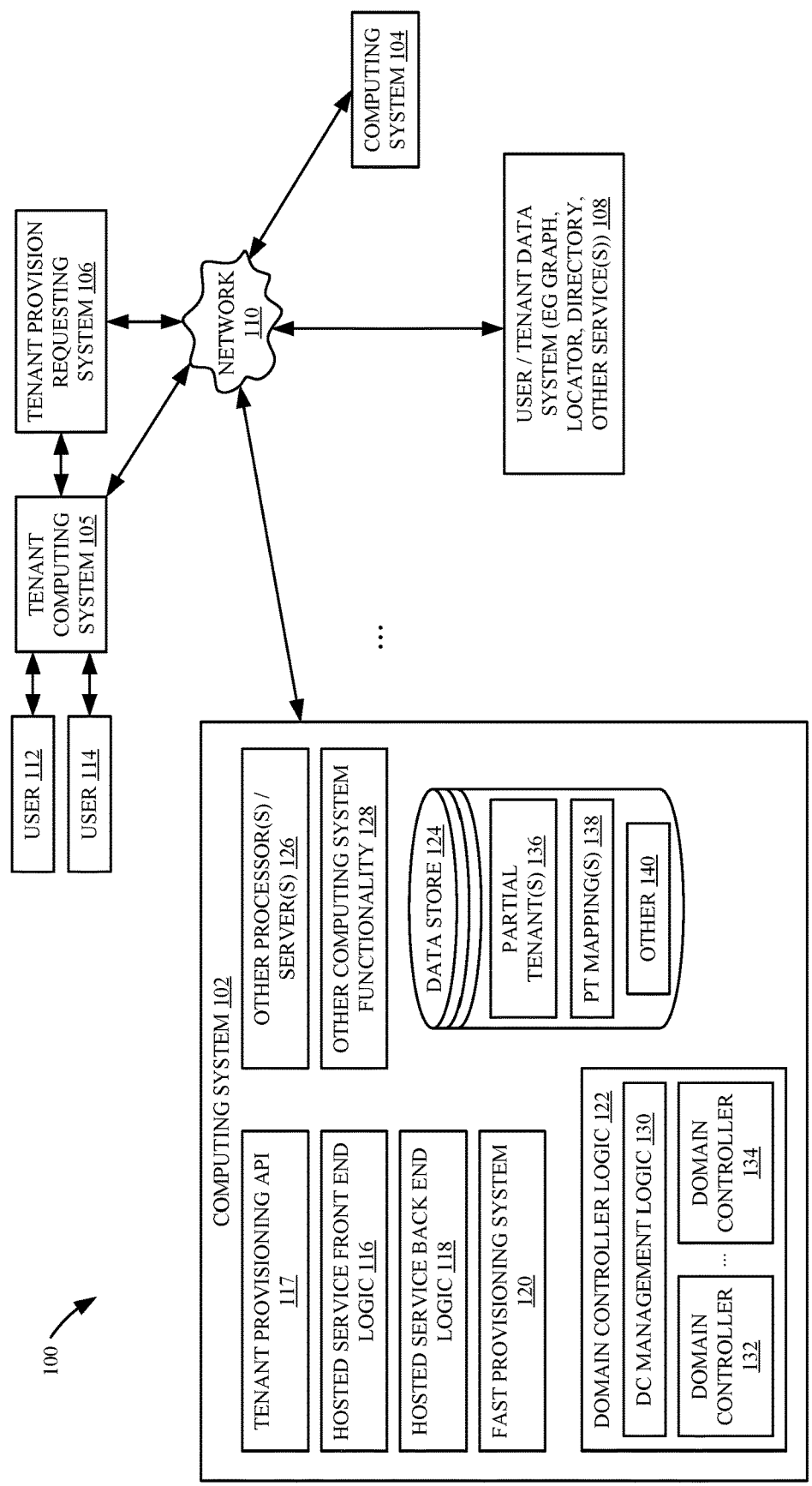
FIG. 1 is a block diagram of one example of a computing system architecture.

FIG. 1 is a block diagram of one example of a computing system architecture 100 in which computing systems 102-104 host services for one or more tenants, through tenant computing system(s) 105 that have users 112-114. A tenant may request access to the hosted service through a tenant provision requesting system 106. Architecture 100 can also include a user/tenant data system 108 which can be a user graph, a global user or tenant locator, a global tenant or user directory, or any of a wide variety of other services that can provide tenant identifying information for one or more tenants. In the example shown in FIG. 1, computing systems 104-108 are connected for communication over network 110. Network 110 can be any of a wide variety of different types of networks, such as a local area network, a wide area network, a cellular communication network, a near field communication network, or any of a variety of other networks or combinations of networks.

In the example shown in FIG. 1, tenant computing system 105 can be used by a plurality of users 112-114 to access the hosted service from one of computing systems 102-104. In some current systems, an administrative user of tenant computing system 105 may access tenant provision requesting system 106 (which may be a subscription system on another system) to request that a tenant object be provisioned on the hosted service (hosted by computing systems 102-104) for the tenant that is using tenant computing system 105. In some current systems, the process by which a new tenant object is provisioned so that users 112-114 can use the hosted service, can take several minutes, such as ten or more minutes. This is a relatively long latency process which can lead to an increase in computer processing overhead and to user dissatisfaction.

In one example, each computing system 102-104 hosts the hosted service in a different geographic region (or in a different partition) of the hosted service. Also, in one example, computing systems 102-104 are similar. It will be noted that they can be different as well. However, for the purposes of the present description, it is assumed that they are similar so that only computing system 102 is described in more detail.

Computing system 102 includes hosted service front end logic 116, that exposes a tenant provisioning application programming interface (API) 117, hosted service back end logic 118, fast provisioning system 120, domain controller logic 122, data store 124, and it can include a variety of other processors or servers 126 and other computing system functionality 128. Domain controller logic 122 illustratively includes domain controller (DC) management logic 130 that manages a plurality of different domain controllers 132-134. It will be noted that while the term "domain controller" is used herein, they can be any controllers that perform the desired functions. In one example, domain controllers 132-134 can perform a wide variety of different functions for hosted service back end logic 118, such as managing authentication and access to resources (such as the hosted service). In doing so, they generate and maintain a set of partial tenant objects that are replicated across each of the domain controllers 132-134. The partial tenant objects can be maintained as partial tenants 136 in data store 124 (which can be associated with the different domain controllers 132-134) or they can be stored elsewhere. Partial tenant mappings 138 illustratively map the different partial tenant objects 136 to the different domain controllers 132-134. Data store 124 can include a wide variety of other items 140 as well.

Before describing the overall operation of architecture 100 in provisioning a new tenant, a brief description of some of the items in architecture 100, and their operation, will first be provided.

Hosted service front end logic 116 illustratively provides front end functionality for the various users and tenant computing systems that access it. It thus provides an interface to the hosted service back end logic 118 which performs back end services, such as interacting with and manipulating data, interacting with other services and logic, and making calls to various resources. Hosted service back end logic 118 can also provide a tenant provision request to fast provisioning system 120. Fast provisioning system 120 can be part of DC management logic 130, or separate therefrom. In addition, parts of system 120 can be included in DC management logic 130 and parts can be separate. For the purposes of the present discussion, fast provisioning system 120 is shown as being separate from DC management logic 130, but that need not be the case. Fast provisioning system 120 illustratively interacts with domain controller management logic 130 to control the various domain controllers 132-134 in order to maintain a pool or set of partial tenant objects. In one example, the relatively long latency operations that are needed to provision a tenant object are illustratively performed, with placeholder data, so that the set of partial tenant objects already have the relatively long latency operations performed. Then, when a tenant provision request is received, fast provisioning system 120 selects a partial tenant object from the pool and stamps it with tenant-specific attributes, such as a tenant identifier, a custom domain provided by the tenant when the tenant requested access to the hosted service, and one or more users associated with the hosted service account requested by the tenant.

For example, when the request is received, as soon as it is determined that a new tenant wishes to be provisioned, the new tenant (such as an administrative user of the new tenant) can access an application programming interface (API) 117 that is specifically exposed by the hosted service front end logic 116 for fast tenant provisioning. The call illustratively includes tenant and user identifying information as well as domain information requested by the tenant. The hosted service front end logic 116 illustratively identifies a particular partition that the new tenant should belong to. For instance, in one example, the call may be received by the hosted service front end logic 116 that is geographically located closest to the tenant computing system 105 requesting provisioning. However, it may be that the tenant should be provisioned within a different partition, for a variety of different reasons. Thus, the hosted service front end logic 116 that receives the provisioning request determines which particular partition the tenant should be provisioned in, and forwards the call to the fast provisioning system 120 in that particular partition. For purposes of the present description, it will be assumed that the tenant computing system 105 that is to be provisioned on the hosted service is to be provisioned within the partition represented by computing system 102. Thus, the call is passed (either directly or through hosted service back end logic 118) to fast provisioning system 120 so that a tenant object can be quickly provisioned for the requesting tenant.

When the hosted service is an e-mail service, then the tenant that requests access to the e-mail service will provide a tenant identifier, a custom domain, and a user identifier that should be associated with a mailbox in the newly provisioned e-mail tenant object. As is discussed below, some of this information can be obtained from other sources as well, such as the user/tenant data system 108. Fast provisioning system 120 selects a partial tenant object that is mapped to one of domain controllers 132-134 and then replaces the placeholder information on the partial tenant object with the tenant-specific identifier, the custom domain selected by the tenant, and the user information provided by the tenant, for a mailbox in the hosted e-mail service. Simply replacing the tenant identifier, custom domain and user information, is a much lower latency operation than the operations associated with provisioning the partial tenant object, in the first place. Thus, the overall process of provisioning a tenant is expedited greatly. This results in a much improved computing system, because tenant provisioning is carried out much more quickly than in some current systems.

Figure 2:
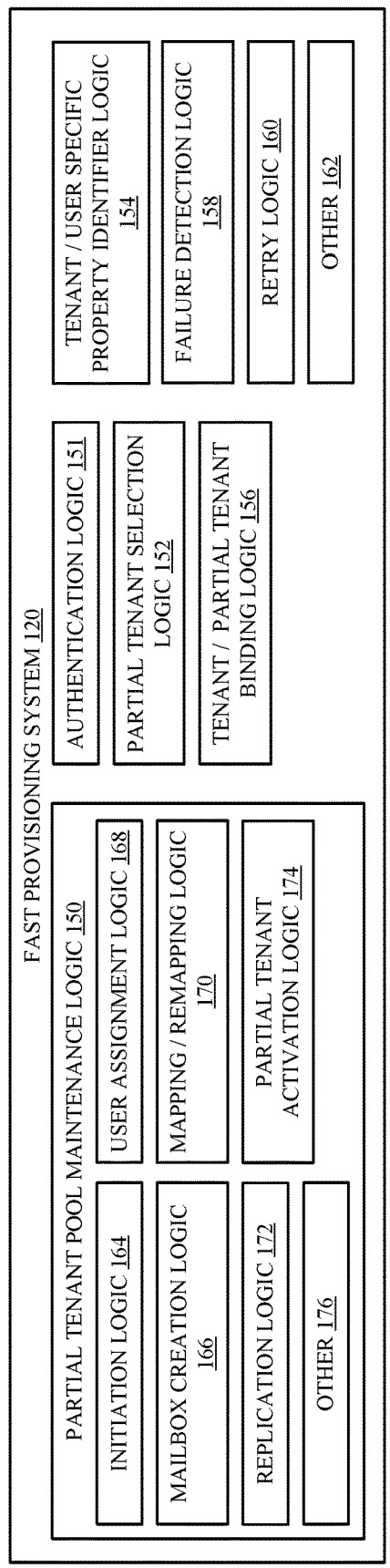
FIG. 2 is a block diagram showing one example of a fast provisioning system in more detail.

FIG. 2 is a block diagram of one example of fast provisioning system 120, in more detail. Fast provision system 120 illustratively includes partial tenant pool maintenance logic 150, authentication logic 151, partial tenant selection logic 152, tenant/user-specific property identifier logic 154, tenant/partial tenant binding logic 156, failure detection logic 158, retry logic 160, and it can include other items 162. Partial tenant pool maintenance logic 150, itself, illustratively includes initiation logic 164, mailbox creation logic 166, user assignment logic 168, mapping/remapping logic 170, replication logic 172, partial tenant activation logic 174, and it can include other items 176.

Partial tenant pool maintenance logic 150 illustratively interacts with DC management logic 130 to control domain controllers 132-134 to generate and maintain a pool or set of partial tenant objects so that new tenants can be quickly provisioned as briefly described above. In doing so, initiation logic 164 initiates the creation of a new partial tenant object. This can be based on the demand for partial tenant objects that have recently been provisioned. It can be based on receiving a new request for provisioning a partial tenant object, or it can be based on the number of currently active partial tenant objects that exist in the pool or set, or based on a wide variety of other items. Mailbox creation logic 166 creates a mailbox (in the scenario where the hosted service is an e-mail system) and provides placeholder information to the partial tenant service object for a variety of items, such as the tenant-specific identifier, the domain for the mailbox, and the particular user information identifying the user of the mailbox. User assignment logic 168 illustratively assigns the partial tenant object (representing the mailbox) to a user identified the placeholder information and mapping/remapping logic 170 maps the newly created partial tenant object to a particular domain controller 132-134. Replication logic 172 replicates the newly created partial tenant object across all of the domain controllers 132-134 and partial tenant activation logic 174 activates the partial tenant object (so that it can be selected by fast provisioning system 120) once it has been replicated across the various domain controllers 132-134.

One reason that the partial tenant objects are replicated across all of the domain controllers 132-134 is that then the partial tenant object can be read from and written to from any of the domain controllers 132-134. The particular domain controller used to read or write to a partial tenant object can be chosen based on load balancing considerations or other considerations. Thus, even if a partial tenant object is mapped to domain controller 134, it can be read from and written to through domain controller 134. If it is written to, the newly written information will be replicated to domain controller 132 when it is replicated across the other domain controllers.

When a request is received to provision a tenant, authentication logic 151 handles authentication and token processing corresponding to the request. Partial tenant selection logic 152 interacts with DC management logic 130 to select a partial tenant from the pool maintained by partial tenant pool maintenance logic 150 and domain controllers 132-134. Tenant/user-specific property identifier logic 154 can identify tenant-specific and user-specific properties for the particular tenant requesting to be provisioned. This information may be provided by the tenant (such as by an administrative user of the tenant) or it may be accessed through other services, such as user/tenant data system 108. Tenant/partial tenant binding logic 156 then binds the requesting tenant to the partial tenant that has been selected. As is described in greater detail below, this is done by replacing the placeholder information in the partial tenant with the tenant-specific and user-specific information, and also by updating various directories or other services to indicate the newly provisioned tenant.

Failure detection logic 158 detects whether the binding has failed and if so, retry logic 160 again tries to select a partial tenant and bind the requesting tenant to the partial tenant to respond to the call to provision a new tenant on the hosted service. If a failure has occurred because the underlying domain controller has crashed or otherwise become unhealthy, then remapping logic 170 remaps the originally selected partial tenant to a different domain controller and replication logic 172 begins replicating that remapping across the other domain controllers, while partial tenant activation logic 174 deactivates that partial tenant until the replication is complete. Partial tenant selection logic 152 also selects a different partial tenant for binding to the requesting tenant. Again, this is described in greater detail below.

Figure 3:
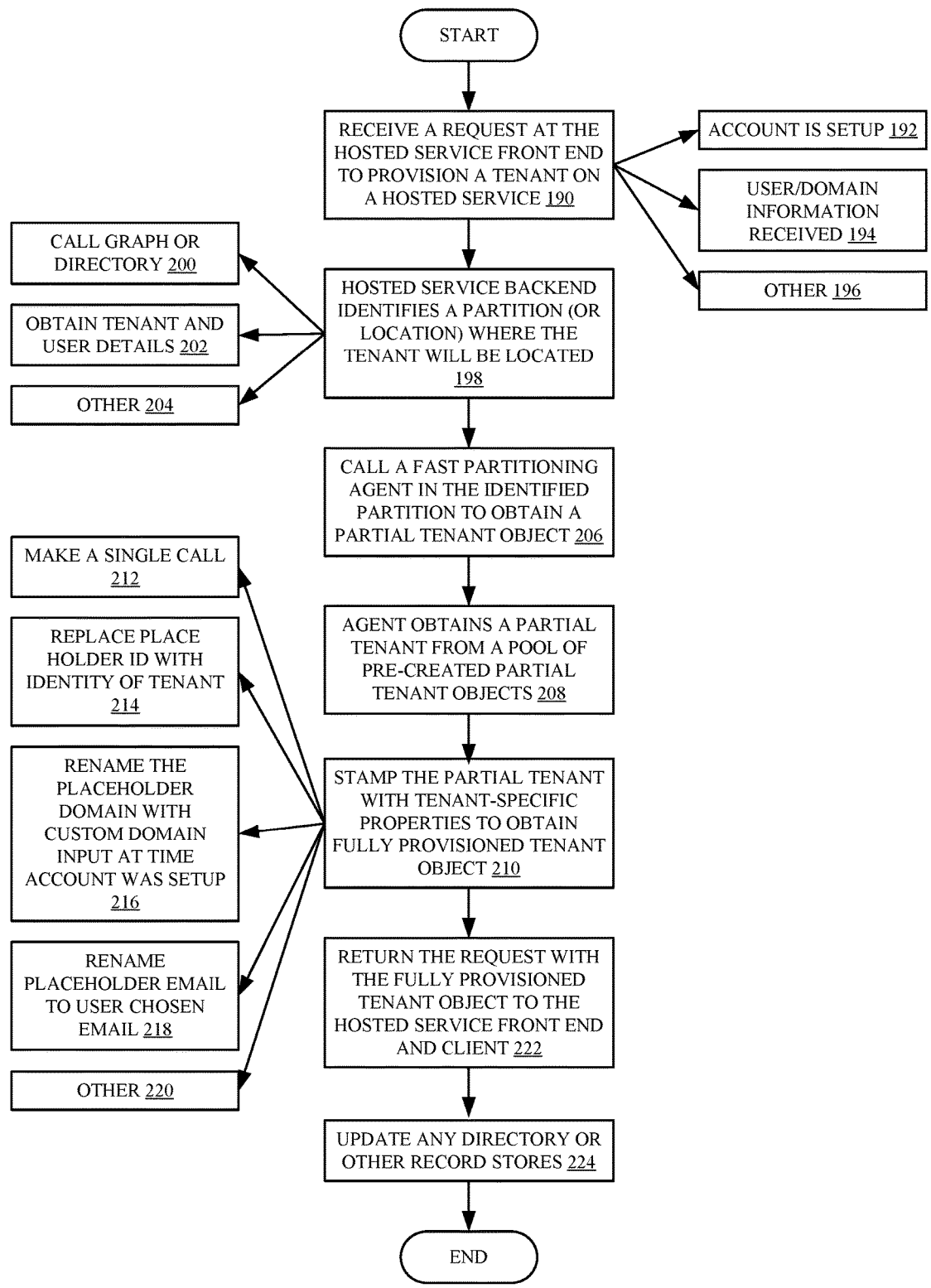
FIG. 3 is a flow diagram illustrating one example of the operation of the fast provisioning system in provisioning a tenant from a set of partial tenants.

FIG. 3 is a flow diagram illustrating one example of the operation of architecture 100 (and fast provisioning system 120) in receiving a request to provision a tenant object within the hosted service, and performing a fast provisioning operation to provision that tenant. FIGS. 1-3 will now be described in conjunction with one another.

Hosted service front end logic 116 first receives, through the exposed tenant provisioning API 117, a request to provision a tenant on the hosted service. This is indicated by block 190 in the flow diagram of FIG. 3. This can occur, for instance, when an administrative user of tenant computing system 105 is attempting to setup an account in the hosted service on computing system 102. This is indicated by block 192. It can occur when the administrative user obtains a subscription to the hosted service through a tenant provision requesting system 106 that provides those subscriptions. The request can be generated in a wide variety of other ways as well.

The request can also include user and domain information that is received from the administrative user of the tenant. This is indicated by block 194. For instance, the request may include tenant identifying information, a custom domain selected by the tenant administrative user, user identifying information, among a wide variety of other things. The request to provision a tenant object on the hosted service can be done in other ways as well, and this is indicated by block 196.

Hosted service back end logic 118 then identifies a particular partition (or location) where the tenant will be located or provisioned. This is indicated by block 198. For instance, it may be that for regulatory or other reasons, the tenant may be assigned to a particular partition of the hosted service. The hosted service back end logic 118 can make this determination based on a variety of different information. For instance, logic 118 can call user/tenant data system 108 to obtain graph or directory information corresponding to the tenant, and determine the partition based on that information. Identifying the partition where the newly provisioned tenant will be located can be done in a wide variety of other ways as well, and this is indicated by block 204.

Hosted service back end logic 118 then makes a call (with the provisioning request) to the fast provisioning system 120 in the identified partition in order to obtain a partial tenant object so that the tenant can be quickly provisioned. Calling a fast provisioning agent (or system 120) in the identified partition is indicated by block 206. For purposes of the present discussion, it will again be assumed that the requesting tenant will be located on the partition of the hosted service represented by computing system 102. Thus, logic 118 calls fast provisioning system 120 to provision the tenant in that partition.

At this point, it is assumed that partial tenant pool maintenance logic 150 in fast provisioning system 120 has already created a pool or set of partial tenant objects (or controlled domain controllers 132-134 to do so). This is described in greater detail below with respect to FIG. 4.

After receiving the request, partial tenant selection logic 152 calls DC management logic 130 to select one of the partial tenant objects from the pool. This is indicated by block 208. Tenant/user-specific property identifier logic 154 then obtains the tenant-specific and user-specific properties that are to be bound to the partial tenant object, in order to service the call to provision a tenant. It can do this by identifying that information in the provisioning request, or it can do it by accessing other services as well. Tenant/partial tenant binding logic 156 then binds the partial tenant object to the requesting tenant. In doing so, it can stamp the partial tenant object with the tenant-specific and user-specific properties to obtain the fully provisioned tenant object. This is indicated by block 210 in the flow diagram of FIG. 3. In one example, binding logic 156 stamps all of this information to the partial tenant object based on a single call. This, in some current systems, is done in multiple calls, which increases the latency of the binding operation. Binding the partial tenant object to the requesting tenant based on a single call is indicated by block 212.

It can bind the two by replacing the placeholder tenant identifying information, which identifies a placeholder tenant, with the tenant-specific identifying information that identifies the requesting tenant, for which the provisioning is being performed. Replacing the placeholder tenant ID with a tenant-specific ID is indicated by block 214.

It can also rename or replace the placeholder domain in the partial tenant object with the custom domain information corresponding to the requesting tenant. This may be information input at the time the account was setup, by the administrative user of the tenant, or it may be provided in other ways. Renaming the placeholder domain with the custom domain is indicated by block 216. It also illustratively renames the placeholder e-mail information in the partial tenant object, identifying a user that corresponds to the mailbox, with the user-specific information corresponding to the user of the tenant being provisioned. Renaming or replacing the placeholder e-mail information with the user-specific e-mail information is indicated by block 218. Binding logic 156 can stamp the partial tenant object with tenant-specific and user-specific properties in other ways as well, and this indicated by block 220.

Assuming the binding was successful (processes corresponding to an unsuccessful binding are described in greater detail below), the binding logic 156 illustratively returns the request for provisioning with the fully provisioned tenant object. The fully provisioned tenant object is returned to the hosted service front end logic 116, and to the client or tenant computing system 105 that requested the provisioning. Returning the request with the fully provisioned tenant object is indicated by block 222 in the flow diagram of FIG. 3.

The hosted service back end logic 118 (or binding logic 156 or other logic) then updates any directories or record stores or other services that need to be updated, with the newly provisioned tenant information. This is indicated by block 224 in the flow diagram of FIG. 3.

At this point, the one or more users of the newly provisioned tenant can access the hosted service through the newly provisioned tenant object. In one example, the fast provisioning of the tenant object, using the pool of partially created tenant objects, greatly reduces the latency with which a new tenant can be provisioned, and thus greatly reduces the time between requesting to provision a tenant and actually giving users of the tenant access to the hosted computing system.

Figure 4:
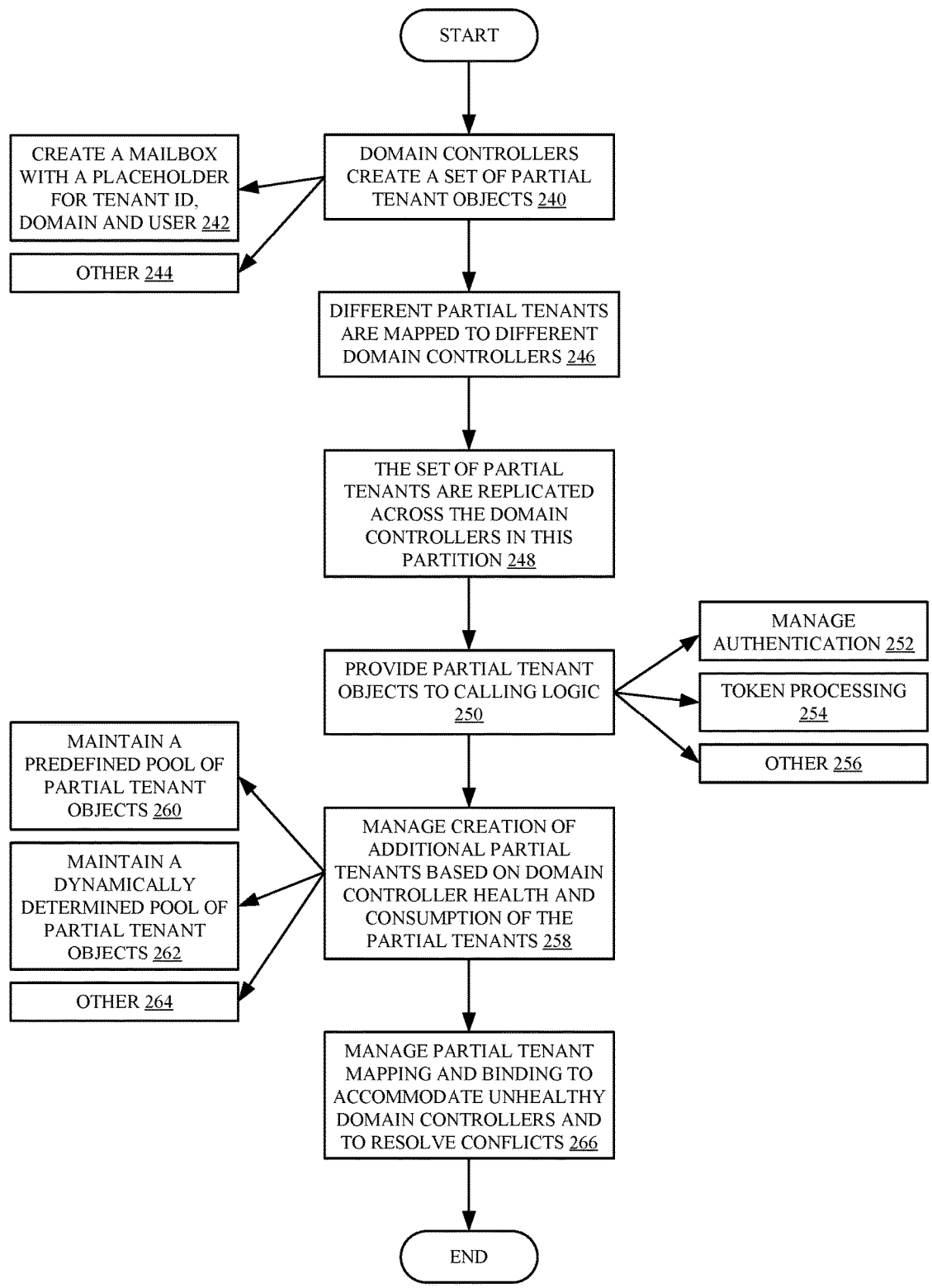
FIG. 4 is a flow diagram illustrating one example of the operation of the architecture illustrated in FIG. 1 in creating the set of partial tenant objects.

FIG. 4 is a flow diagram illustrating one example of the operation of partial tenant pool maintenance logic 150 interacting with DC management logic 130 to control domain controllers 132-134 to create and maintain a pool or set of partial tenant objects to accommodate fast provisioning of requesting tenants. Initiation logic 164 first initiates the creation of one or more partial tenant objects, until a full set (or pool) of partial tenant objects is created. The initiation logic 164 can do this until a predefined number of partial tenant objects are created, or it can initiate creation of a dynamically changing number of partial tenant objects. All of these are contemplated herein. Where the hosted service is an email service, the partial tenant objects are mailboxes created within the email service. In that case, mailbox creation logic 166 creates the mailboxes. Creating an initial set of partial tenant objects using by the domain controllers 132-134 is indicated by block 240 in the flow diagram of FIG. 4. As mentioned above, where the hosted service is an e-mail service, each partial tenant object can be a mailbox with a placeholder for the tenant identifier, the domain and the user information. This is indicated by block 242. The partial tenant objects can be created in a wide variety of other forms as well, and this is indicated by block 244.

Mapping/remapping logic 170 maps the different partial tenant objects to different domain controllers. This can be stored as partial tenant mappings 138 in data store 124 or elsewhere. Mapping the partial tenant objects to the different domain controllers is indicated by block 246 in the flow diagram of FIG. 4.

Replication logic 172 illustratively replicates the tenants across the domain controllers in the particular partition in which they are maintained. This is indicated by block 248 in the flow diagram of FIG. 4.

As calls come in to provision new tenants, the partial tenant objects are provided to the calling logic, so that the new tenants can be quickly provisioned. This is indicated by block 250. In doing so, authentication logic 151 (which can be in fast provisioning system 120 or elsewhere) illustratively manages authentication and token processing for the request. This is indicated by blocks 252 and 254 in the flow diagram of FIG. 4. The partial tenant objects can be provided to the calling logic in other ways as well, and this can involve other processing steps as well, as indicated by block 256.

Partial tenant pool maintenance logic 150 manages the creation of additional partial tenant objects based on the health of the domain controllers 132-134 and based on consumption of the partial tenant objects by requesting systems. This is indicated by block 258.

By way of example, as discussed above, initiation logic 164 can initiate the creation of new partial tenant objects to maintain a predefined number of partial tenant objects in the pool or set of partial tenant objects. This is indicated by block 260. In such a scenario, as the partial tenant objects are used in responding to provisioning requests, new partial tenant objects can be created in the pool or set.

Initiation logic 164 can initiate the creation of new partial tenant objects to maintain a dynamically determined number of partial tenant objects in the pool or set. This is indicated by block 262. For instance, it may be that there are particular times when demand for tenant provisioning is particularly high. During those times (or when the demand increases), then initiation logic 164 may be configured to increase the number of partial tenant objects maintained in the pool or set of partial tenant objects for fast provisioning. As the demand decreases, that number may be decreased dynamically as well. These and other ways of managing creation of additional partial tenant objects are contemplated herein. This is indicated by block 264.

Fast provisioning system 120 also interacts with DC management logic 130 to control domain controllers 132-134 to manage partial tenant mapping (to domain controllers) and binding (to tenants) to accommodate unhealthy domain controllers and to resolve conflicts. This is indicated by block 266 in the flow diagram of FIG. 4. For instance, it may be that fast provisioning system 120 receives two substantially simultaneous requests for a partial tenant object and therefore the two requests may be made for the same single partial tenant object. When this occurs, conflict resolution rules can be applied to resolve the conflict and to choose different partial tenant objects for the different requests.

In addition, once a partial tenant object (that is mapped to a particular domain controller) has been selected for binding to a tenant, the domain controller may crash or otherwise become unhealthy. In that case, another partial tenant object will be selected for binding, while the initial partial tenant object is remapped to a different domain controller, for later use in fast provisioning of tenants. Examples of this are now described in greater detail with respect to FIGS. 5 and 6.

Figure 5:
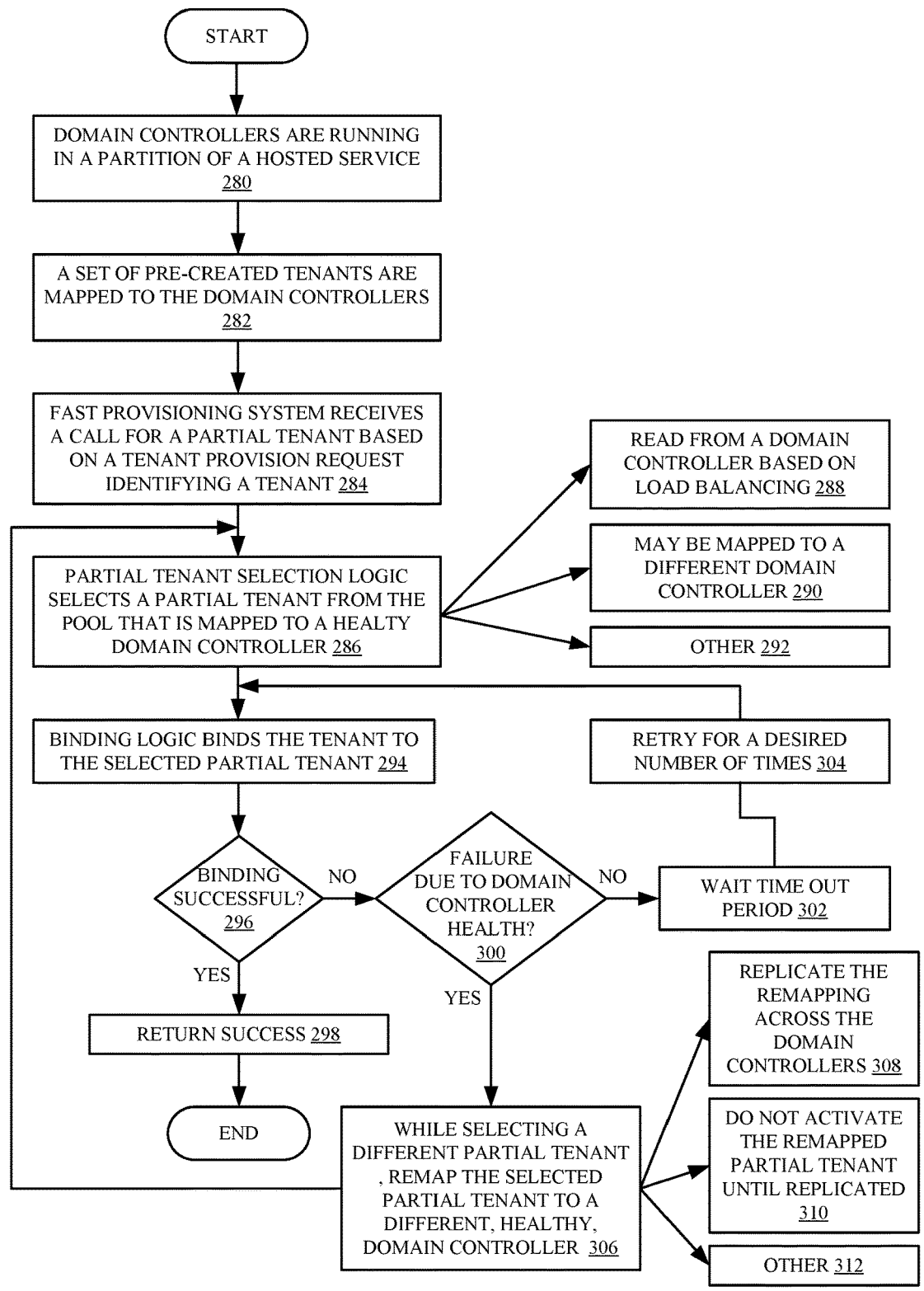
FIG. 5 is a flow diagram illustrating one example of the operation of the architecture shown in FIGS. 1 and 2 in maintaining and repairing a set of partial tenant objects.

FIG. 5 is a flow diagram illustrating how the pool or set of partial tenant objects is maintained by fast provisioning system 120, and DC management logic 130, when a domain controller crashes or otherwise becomes unhealthy.

It is first assumed that domain controllers 132-134 are running in a particular partition (e.g., on computing system 102) of the hosted service. This is indicated by block 280 in the flow diagram of FIG. 5. It is also assumed, as discussed above with respect to FIG. 4, that a set of pre-created partial tenant objects are mapped to the various domain controllers. This is indicated by block 282. In one example, each partial tenant object is mapped to a single domain controller, but is replicated across all domain controllers so that it can be accessed through any of the domain controllers 132-134.

Fast provisioning system 120 then receives a call for a partial tenant object, based upon a tenant provision request. The tenant provision request illustratively includes tenant-specific and user-specific information identifying the tenant, domain and user for the tenant to be provisioned. Receiving the call is indicated by block 284. Partial tenant selection logic 152 then selects a partial tenant object from the pool or set of partial tenant objects that is being maintained by the domain controllers 132-134. In one example, the partial tenant object that is selected is one that is mapped to a currently healthy domain controller. Selecting a partial tenant object is indicated by block 286.

Also, in one example, the selected partial tenant object can be read from a domain controller that is not the domain controller it is mapped to. This can be done based on load balancing considerations or for other reasons. Reading from a domain controller based on load balancing considerations is indicated by block 288. The fact that the partial tenant object that is selected may be mapped to a different domain controller from the domain controller that it is read from is indicated by block 290. The partial tenant object can be selected in a wide variety of other ways as well, and this is indicated by block 292.

Tenant/user-specific property identifier logic 154 illustratively identifies the tenant-specific and user-specific information that is to be bound to the selected partial tenant object. Tenant/partial tenant binding logic 156 then binds the tenant to the selected partial tenant object. This is indicated by block 294. As discussed above, this can be done by renaming the tenant identifier in the partial tenant object to that indicated by the tenant-specific information. It can also include renaming the placeholder domain in the partial tenant object to the custom domain specified by the requesting tenant. It can include associating a user specified by the tenant with a mailbox by replacing the placeholder user information in the partial tenant object with the user-specific information corresponding to the user in the requesting tenant.

Failure detection logic 158 determines whether the binding is successful. This is indicated by block 296. If so, then the process simply returns an indication that the tenant has been fully provisioned, successfully. This is indicated by block 298. The user can now access the hosted service. However, if a failure is detected, then failure detection logic 158 determines whether the failure is due to the health of the domain controller to which the partial tenant object is mapped. This is indicated by block 300. If not, then retry logic 160 illustratively waits for a time out period as indicated by block 302 and controls binding logic 156 to again attempt to bind the tenant to the partial tenant object. This is indicated by block 304. This can be repeated a desired number of times.

However, if the binding failure is because the domain controller that the selected partial tenant object is mapped to is unhealthy (as indicated at block 300), then failure detection logic 158 controls partial tenant selection logic 152 to select a different partial tenant object for binding to the requesting tenant. While this is occurring, remapping logic 170 remaps the selected partial tenant object (that was previously selected and to which the binding failed) to a different, healthy, domain controller. This is indicated by block 306 in the flow diagram of FIG. 5.

When this remapping occurs, replication logic 172 replicates that remapping across the various other domain controllers. This is indicated by block 308. Partial tenant activation logic 174 maintains the remapped partial tenant object in an inactive state (so it cannot be selected for binding) until the remapping has been replicated across the domain controllers, at which point it activates the remapped partial tenant object (so that it is available for binding). This is indicated by block 310. The remapping can be done in other ways as well, and this is indicated by block 312. While the remapping and replication is taking place, partial tenant selection logic 152 selects the new partial tenant object as indicated by the process returning to block 286 in the flow diagram of FIG. 5.

Figure 6:
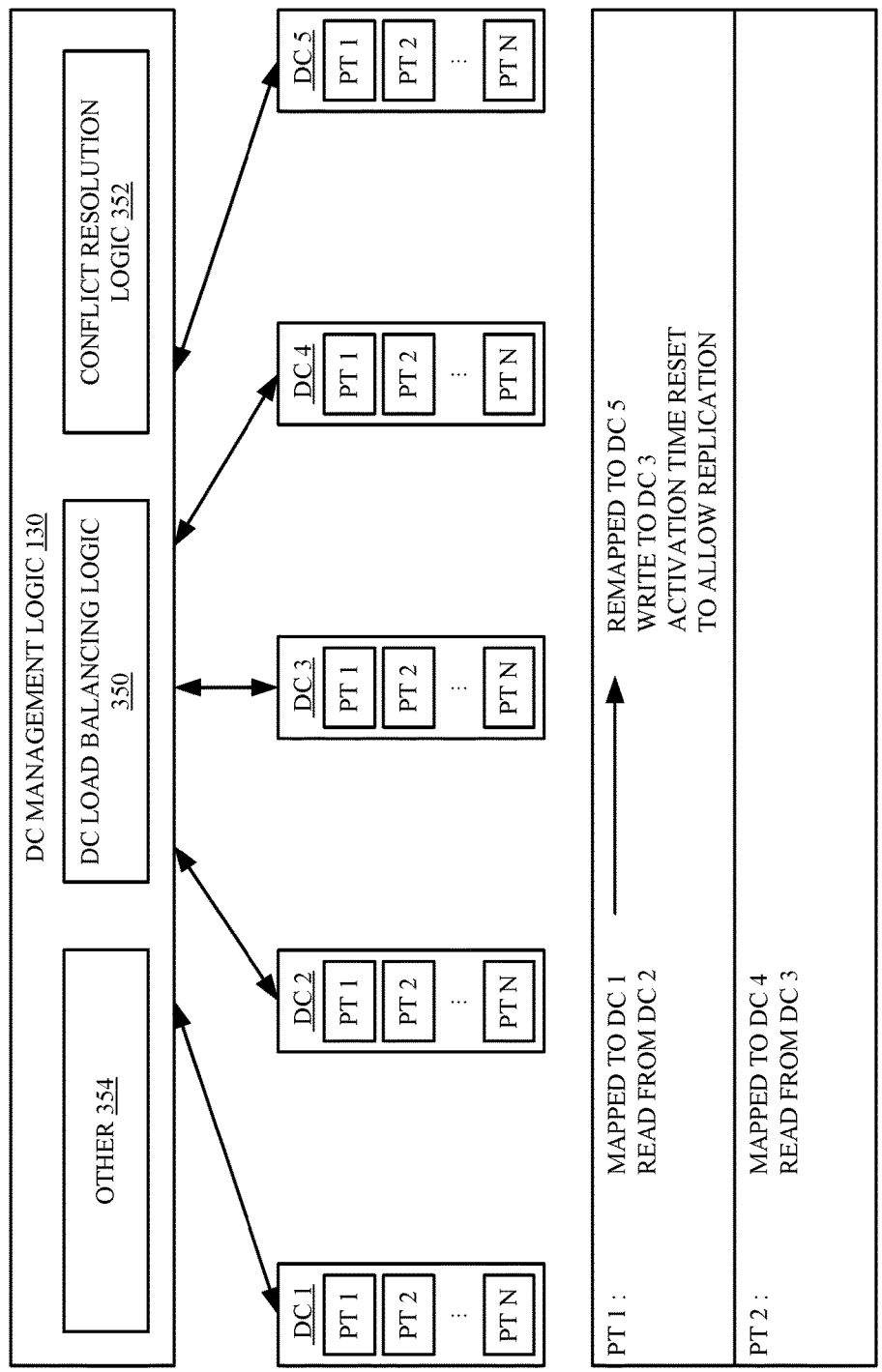
FIG. 6 illustrates one example of how partial tenant objects are remapped in the case of a domain controller failure.

FIG. 6 is a partial block diagram, partial flow diagram illustrating how a partial tenant object is remapped to a different domain controller in the event that the domain controller it is originally mapped to becomes unhealthy. FIG. 6 shows that, in one example, DC management logic 130 can include DC load balancing logic 350, conflict resolution logic 352, and it can include other items 354. As requests for a partial tenant object are received by DC management logic 130, DC load balancing logic 350 selects a particular domain controller (in the example shown in FIG. 5 they are labeled DC1-DC5) from which the selected partial tenant object will be read. This can be done based on load balancing criteria, or on other criteria. As discussed above, the particular domain controller that the selected partial tenant object is read from may not be the one that it is mapped to. In addition, conflict resolution logic 352 can resolve conflicts where a single partial tenant object is selected by two different provisioning processes.

In the present example, it is assumed that partial tenant object PT1 is mapped to domain controller DC1, and the DC load balancing logic 350 determines that, when it is selected, it will be read from domain controller DC2.

During the provisioning process, failure detection logic (shown in FIG. 2) illustratively determines that domain controller DC1 has become unhealthy. In that case, partial tenant selection logic 152 selects another partial tenant object (which is mapped to a healthy domain controller) for binding to the requesting tenant. In the example illustrated in FIG. 6, partial tenant object PT2 is selected, which is originally mapped to domain controller DC4. Again, because of load balancing or other criteria, logic 350 determines that PT2 will be read from domain controller DC3. Provisioning then proceeds by binding the requesting tenant to the partial tenant object PT2. At the same time, partial tenant object PT1 is remapped to a healthy domain controller (in this case domain controller DC5), and the remapping can be written to yet a different domain controller (in the case domain controller DC3). This remapping is then replicated across all of the remaining, healthy domain controllers and activation logic 174 does not re-activate partial tenant object PT1 until it has been successfully remapped and replicated across all the remaining, healthy domain controllers. In this way, even though domain controllers DC1-DC5 intermittently may become unhealthy, and then be repaired, the pool or set of partial tenant objects can be maintained so that fast provisioning can be continued, without interruption It can thus be seen that the present discussion greatly enhances a computing system that hosts a service for various tenants. The fast provisioning system in a partition corresponding to the requesting tenant can be accessed to obtain a partial tenant object, very quickly. The system can bind that partial tenant object to the requesting tenant so the requesting tenant can begin using the hosted service in a fraction of the time that was required for tenant provisioning under prior systems. The pool of partial tenant objects, that is used for fast provisioning, can be maintained even though the domain controllers operating on them may intermittently become unhealthy. All of this enhances the speed of the computing system in provisioning tenants, and it enhances the accuracy of the provisioning process because it can continue even when the domain controllers become unhealthy. It also greatly enhances the user experience by drastically reducing the latency associated with the tenant provisioning process.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one example, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 7:
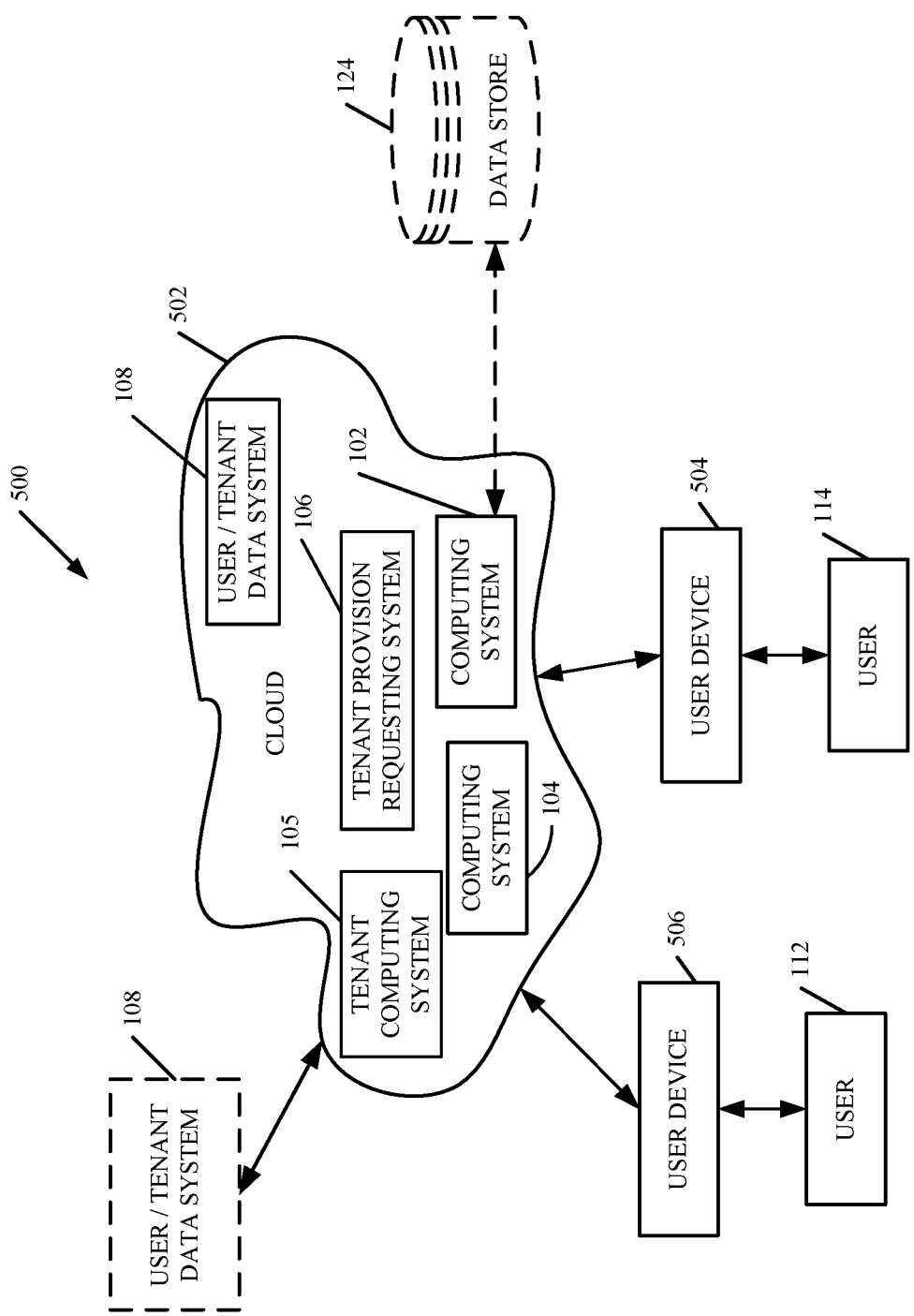
FIG. 7 is a block diagram showing one example of the architecture illustrated in FIG. 1, deployed in a cloud computing architecture.

FIG. 7 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 7, some items are similar to those shown in FIG. 1 and they are similarly numbered. FIG. 7 specifically shows that computing systems 102-108 can be located in cloud 502 (which can be public, private, or a combination where portions are public while others are private). Therefore, users 112-114 uses user devices 504-506 to access those systems through cloud 502.

FIG. 7 also depicts another example of a cloud architecture. FIG. 7 shows that it is also contemplated that some elements of architecture 100 can be disposed in cloud 502 while others are not. By way of example, data store 124 can be disposed outside of cloud 502, and accessed through cloud 502. In another example, system 108 (or other items) can be outside of cloud 502. Regardless of where they are located, they can be accessed directly by devices 504-506, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 8:
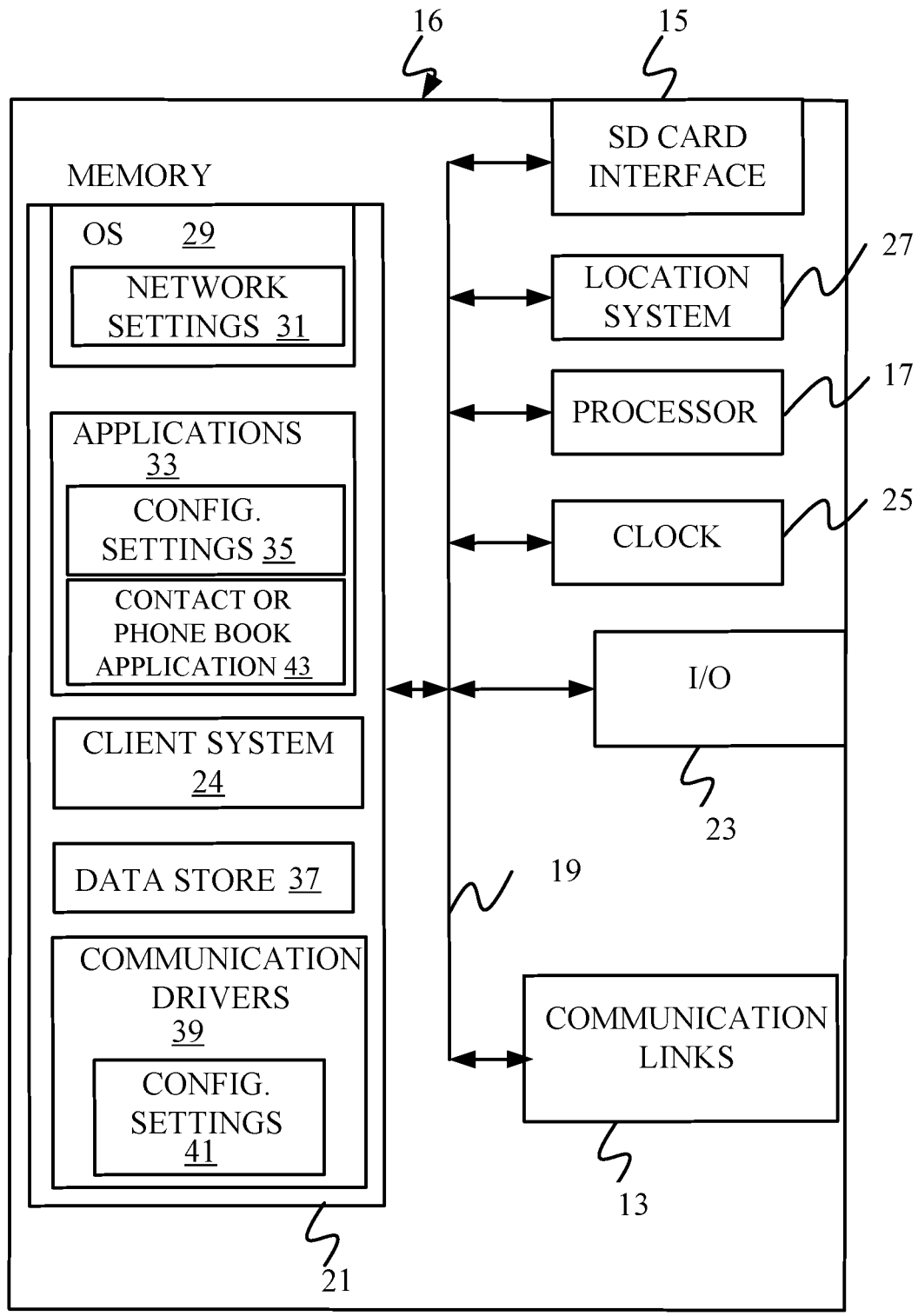
FIGS. 8-10 show examples of mobile devices that can be used in the architectures shown in the previous figures.
Figure 9:
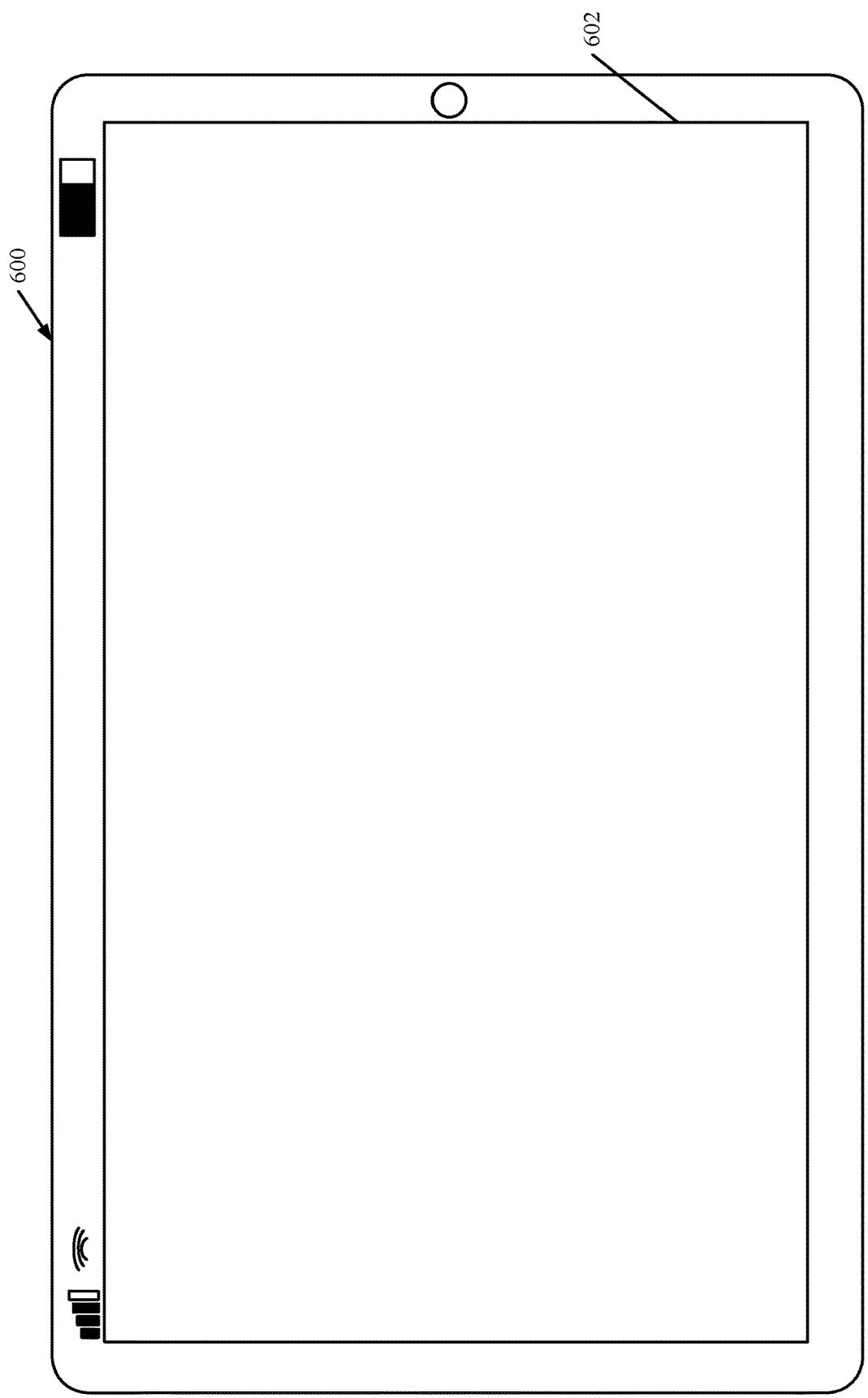
Figure 10:
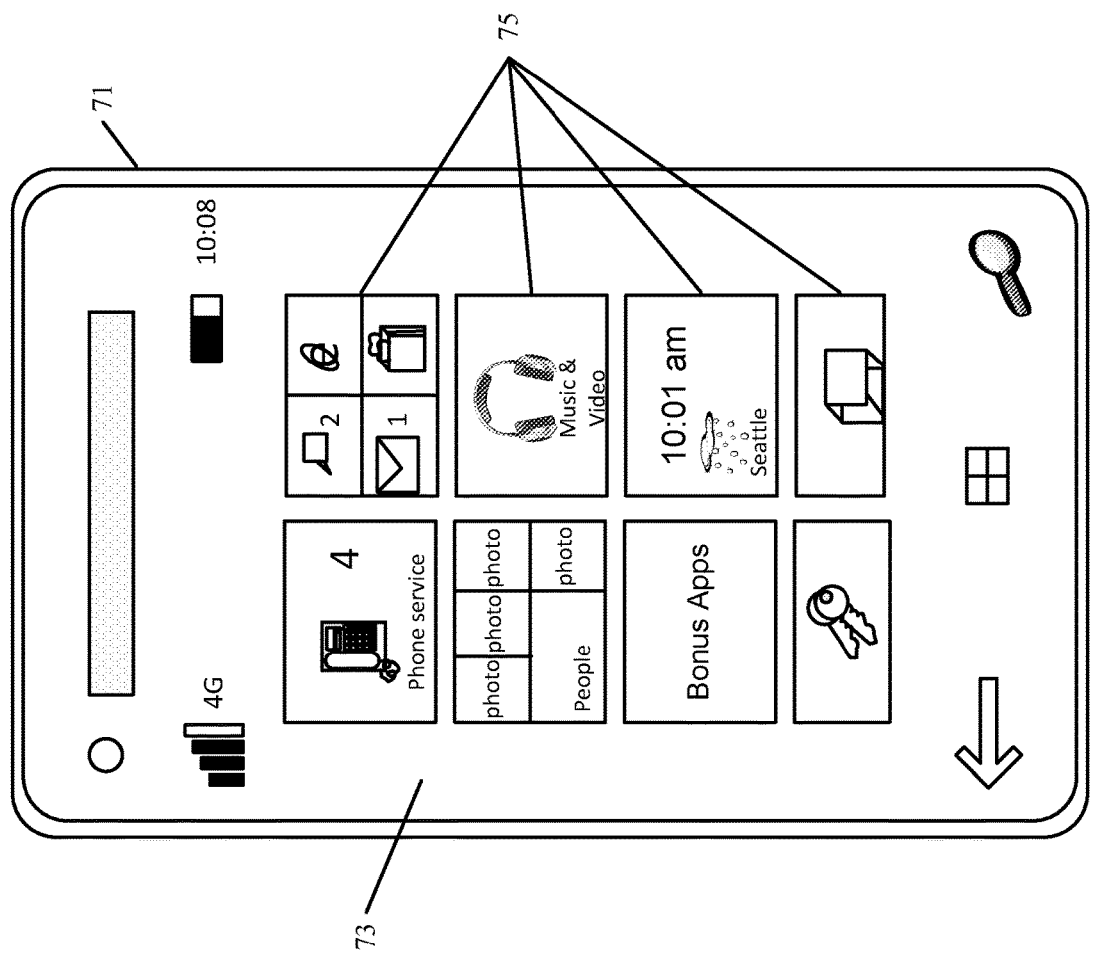

FIG. 8 is a simplified block diagram of one illustrative example of a handheld or mobile computing device that can be used as a user's or client's hand held device 16, in which the present system (or parts of it) can be deployed. FIGS. 9-10 are examples of handheld or mobile devices.

FIG. 8 provides a general block diagram of the components of a client device 16 that can run components of architecture 100 or user devices 504-506 or system 116 or that interacts with architecture 100, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1Xrtt, and Short Message Service, which are wireless services used to provide cellular access to a network, as well as Wi-Fi protocols, and Bluetooth protocol, which provide local wireless connections to networks.

In other examples, applications or systems are received on a removable Secure Digital (SD) card that is connected to a SD card interface 15. SD card interface 15 and communication links 13 communicate with a processor 17 (which can also embody processors or servers from other FIGS.) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client system 24 which can run various applications or embody parts or all of architecture 100. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 9 shows one example in which device 16 is a tablet computer 600. In FIG. 9, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 10 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 11:
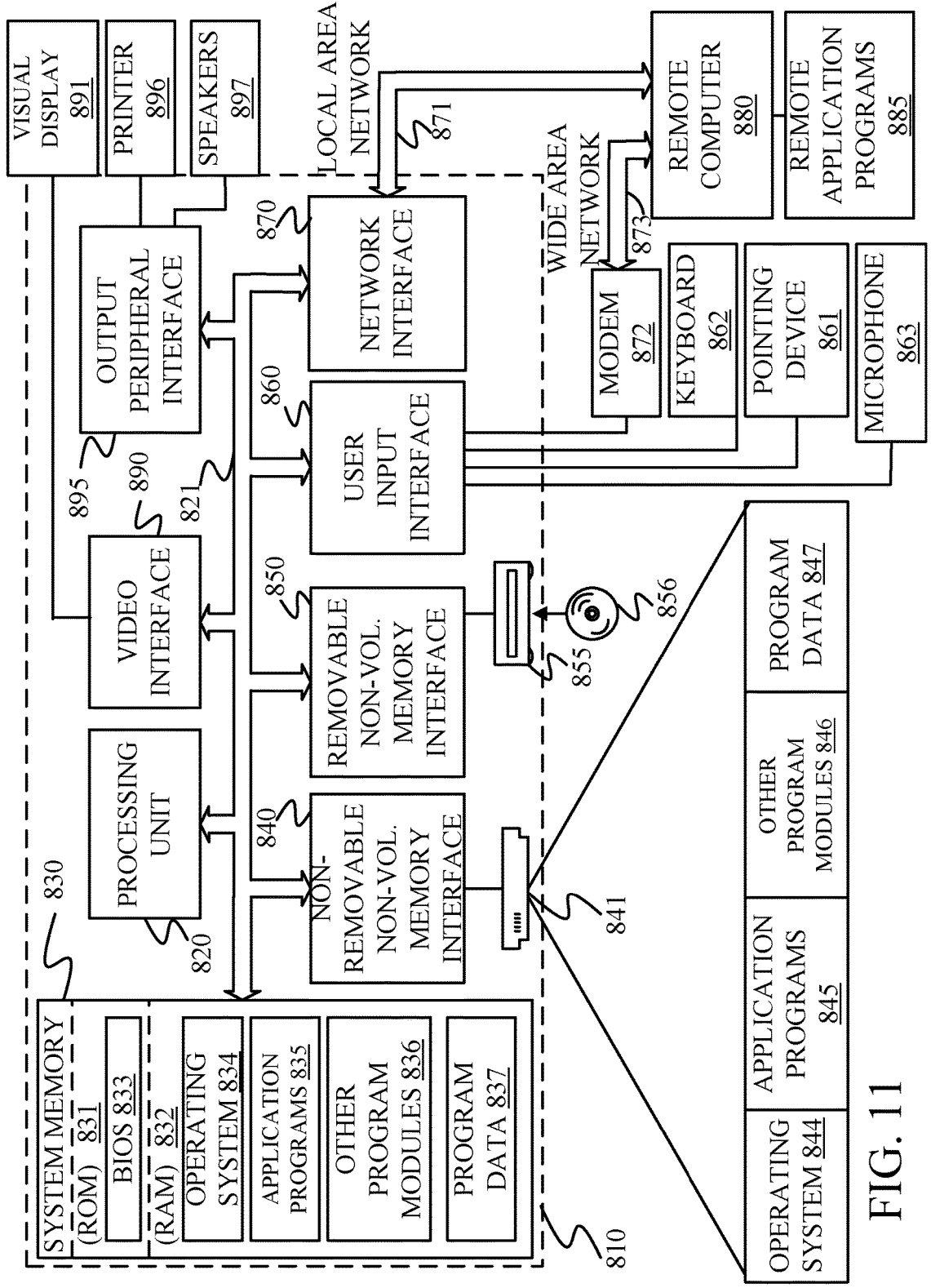
FIG. 11 is a block diagram of one example of a computing environment that can be used in the architectures shown in the previous figures.

FIG. 11 is one example of a computing environment in which architecture 100, or parts of it, (for example) can be deployed. With reference to FIG. 11, an example system for implementing some embodiments includes a general-purpose computing device in the form of a computer 810. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 11.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 11 illustrates operating system 834, application programs 835, other program modules 836, and program data 837.

The computer 810 may also include other removable/non-removable volatile/nonvolatile computer storage media. By way of example only, FIG. 11 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 11, provide storage of computer readable instructions, data structures, program modules and other data for the computer 810. In FIG. 11, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 11 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 11 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computing system, comprising:
hosted service logic that hosts a service for a plurality of different tenants and exposes an application programming interface that is called to provision a new tenant on the hosted service;
partial tenant pool maintenance logic that generates a pool of partial tenant objects each mapped to a domain controller;
partial tenant selection logic that selects a first partial tenant object, mapped to a first domain controller, from the pool of partial tenant objects, for binding to tenant-specific data, based on a call to provision the new tenant;
failure detection logic that detects a failure in binding the tenant-specific data to the first partial tenant object; and
remapping logic that remaps the first partial tenant object to a different domain controller, other than the first domain controller, based on the failure detection, the partial tenant selection logic selecting a second partial tenant object, mapped to a second domain controller, for binding to the tenant-specific data during remapping of the first partial tenant object.

Example 2 is the computing system of any or all previous examples wherein the hosted service is an electronic mail (email) service and wherein the partial tenant pool maintenance logic comprises:

mailbox creation logic configured to generate, as a partial tenant object, a mailbox in the email service.

Example 3 is the computing system of any or all previous examples wherein the mailbox creation logic is configured to create the mailbox in the email system with tenant placeholder information and further comprising:

tenant/partial tenant binding logic configured to replace the tenant placeholder information with tenant-specific identifier information on the mailbox based on the call to provision the new tenant.

Example 4 is the computing system of any or all previous examples wherein the mailbox creation logic is configured to create the mailbox in the email system with domain placeholder information and wherein the tenant/partial tenant binding logic is configured to replace the domain placeholder information with tenant-specific domain information on the mailbox based on the call to provision the new tenant.

Example 5 is the computing system of any or all previous examples wherein the mailbox creation logic is configured to create the mailbox in the email system with user placeholder information and wherein the tenant/partial tenant binding logic is configured to replace the user placeholder information with user-specific user information on the mailbox based on the call to provision the new tenant.

Example 6 is the computing system of any or all previous examples wherein the tenant/partial tenant binding logic is configured to replace the tenant placeholder information with the tenant-specific identifier information, the domain placeholder information with the tenant-specific domain information and the user placeholder information with the user-specific user information based on a single call to provision the new tenant.

Example 7 is the computing system of any or all previous examples wherein the hosted service logic is configured to, in response to receiving the call, through the API, to provision the new tenant, identify a location where the new tenant is to be hosted and to re-route the call to the identified location.

Example 8 is the computing system of any or all previous examples wherein the partial tenant pool maintenance logic comprises:

replication logic configured to replicate the pool of partial tenant objects across a plurality of domain controllers.

Example 9 is the computing system of any or all previous examples wherein the partial tenant pool maintenance logic comprises:

partial tenant activation logic configured to deactivate the first partial tenant object, so that it is not selectable by the partial tenant selection logic, while the remapping logic is remapping the first partial tenant object to the different domain controller and while the replication logic is replicating the remapping across the plurality of domain controllers.

Example 10 is the computing system of any or all previous examples and further comprising:

property identifier logic configured to identify the tenant-specific domain information and the user-specific user information from the call to provision the new tenant.

Example 11 is the computing system of any or all previous examples wherein the property identifier is configured to call an external user/tenant data system, external to the computing system, to identify at least a portion of the tenant-specific data that is bound to the partial tenant object by the tenant/partial tenant binding logic.

Example 12 is a computer implemented methoding system, comprising:

generating a pool of partial tenant objects on a hosted service, each partial tenant object being mapped to a domain controller;

receiving a call to provision a new tenant on an application programming interface (API) exposed by hosted service logic that hosts the hosted service for a plurality of different tenants;

selecting a first partial tenant object, mapped to a first domain controller, from the pool of partial tenant objects, for binding to tenant-specific data, based on the call to provision the new tenant;

detecting a failure in binding the tenant-specific data to the first partial tenant object; and remapping the first partial tenant object to a different domain controller, other than the first domain controller, based on the failure detection; and selecting a second partial tenant object, mapped to a second domain controller, for binding to the tenant-specific data during remapping of the first partial tenant object.

Example 13 is the computer implemented method of any or all previous examples wherein the hosted service is an electronic mail (email) service and wherein generating a pool of partial tenant objects comprises:

generating, as a partial tenant object, a mailbox in the email service.

Example 14 is the computer implemented method of any or all previous examples wherein generating the mailbox in the email system comprises generating the mailbox with tenant placeholder information, and further comprising:

binding the mailbox to the tenant-specific data by replacing the tenant placeholder information with tenant-specific identifier information on the mailbox based on the call to provision the new tenant.

Example 15 is the computer implemented method of any or all previous examples wherein generating the mailbox comprises generating the mailbox in the email system with domain placeholder information and wherein binding the mailbox to the tenant-specific data comprises:

binding the mailbox to the tenant-specific data by replacing the domain placeholder information with tenant-specific domain information on the mailbox based on the call to provision the new tenant.

Example 16 is the computer implemented method of any or all previous examples wherein generating the mailbox comprises generating the mailbox in the email system with user placeholder information and wherein binding the mailbox to the tenant-specific data comprises:

binding the mailbox to the tenant-specific data by replacing the user placeholder information with user-specific user information on the mailbox based on the call to provision the new tenant.

Example 17 is the computer implemented method of any or all previous examples wherein binding the mailbox to the tenant-specific data comprises:

replacing the tenant placeholder information with the tenant-specific identifier information, the domain placeholder information with the tenant-specific domain information, and the user placeholder information with the user-specific user information, based on a single call to provision the new tenant.

Example 18 is the computer implemented method of any or all previous examples and further comprising:

in response to receiving the call, through the API, to provision the new tenant, identifying a location where the new tenant is to be hosted; and re-routing the call to the identified location.

Example 19 is a computing system, comprising:

hosted service logic that hosts a service for a plurality of different tenants and exposes an application programming interface that is called to provision a new tenant on the hosted service;

partial tenant pool maintenance logic that generates a pool of partial tenant objects each mapped to a domain controller;

partial tenant selection logic that selects a first partial tenant object, mapped to a first domain controller, from the pool of partial tenant objects, for binding to tenant-specific data, based on a call to provision the new tenant;

failure detection logic that detects a failure in binding the tenant-specific data to the first partial tenant object;

remapping logic that remaps the first partial tenant object to a different domain controller, other than the first domain controller, based on the failure detection, the partial tenant selection logic selecting a second partial tenant object, mapped to a second domain controller, for binding to the tenant-specific data during remapping of the first partial tenant object;

replication logic configured to replicate the pool of partial tenant objects across a plurality of domain controllers.

Example 20 is the computing system of any or all previous examples wherein the partial tenant pool maintenance logic comprises:

partial tenant activation logic configured to deactivate the first partial tenant object, so that it is not selectable by the partial tenant selection logic, while the remapping logic is remapping the first partial tenant object to the different domain controller and while the replication logic is replicating the remapping across the plurality of domain controllers.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system, comprising:
at least one processor;
memory storing instructions executable by the at least one processor, wherein the instructions, when executed, cause the computing system to:
host a service for a plurality of different tenants and expose an application programming interface that is called to provision a new tenant on the hosted service;
generate a pool of partial tenant objects each mapped to a domain controller;
select a first partial tenant object, mapped to a first domain controller, from the pool of partial tenant objects, for binding to tenant-specific data, based on a call to provision the new tenant;
detect a failure in binding the tenant-specific data to the first partial tenant object;
remap the first partial tenant object to a different domain controller, other than the first domain controller, based on the failure detection; and
select a second partial tenant object, mapped to a second domain controller, for binding to the tenant-specific data during remapping of the first partial tenant object.

2. The computing system of claim 1 wherein the hosted service is an electronic mail (email) service and wherein the instructions cause the computing system to:
generate, as a partial tenant object, a mailbox in the email service.

3. The computing system of claim 2 wherein the instructions cause the computing system to:
create the mailbox in the email system with tenant placeholder information; and
replace the tenant placeholder information with tenant-specific identifier information on the mailbox based on the call to provision the new tenant.

4. The computing system of claim 3 wherein the instructions cause the computing system to:
create the mailbox in the email system with domain placeholder information; and
replace the domain placeholder information with tenant-specific domain information on the mailbox based on the call to provision the new tenant.

5. The computing system of claim 4 wherein the instructions cause the computing system to:
create the mailbox in the email system with user placeholder information; and
replace the user placeholder information with user-specific user information on the mailbox based on the call to provision the new tenant.

6. The computing system of claim 5 wherein the instructions cause the computing system to:
replace the tenant placeholder information with the tenant-specific identifier information, the domain placeholder information with the tenant-specific domain information and the user placeholder information h the user-specific user information based on a single call to provision the new tenant.

7. The computing system of claim 1 wherein the instructions cause the computing system to:
in response to receiving the call, through the API, to provision the new tenant, identify a location where the new tenant is to be hosted and to re-route the call to the identified location.

8. The computing system of claim 1 wherein the instructions cause the computing system to:
replicate the pool of partial tenant objects across a plurality of domain controllers.

9. The computing system of claim 8 wherein the instructions cause the computing system to:
deactivate the first partial tenant object, so that it is not selectable by the partial tenant selection logic, while the first partial tenant object is remapped to the different domain controller and while the remapping is replicated across the plurality of domain controllers.

10. The computing system of claim 5 wherein the instructions cause the computing system to:
identify the tenant-specific domain information and the user-specific user information from the call to provision the new tenant.

11. The computing system of claim 10 wherein the instructions cause the computing system to call an external user/tenant data system, external to the computing system, to identify at least a portion of the tenant-specific data that is bound to the partial tenant object by the tenant/partial tenant binding logic.

12. A computer implemented method, comprising:
    generating a pool of partial tenant objects on a hosted service, each partial tenant object being mapped to a domain controller;
    receiving a call to provision a new tenant on an application programming interface (API) exposed by hosted service logic that hosts the hosted service for a plurality of different tenants;
    selecting a first partial tenant object, mapped to a first domain controller, from the pool of partial tenant objects, for binding to tenant-specific data, based on the call to provision the new tenant;
    detecting a failure in binding the tenant-specific data to the first partial tenant object; and
    remapping the first partial tenant object to a different domain controller, other than the first domain controller, based on the failure detection; and
    selecting a second partial tenant object, mapped to a second domain controller, for binding to the tenant-specific data during remapping of the first partial tenant object.

13. The computer implemented method of claim 12 wherein the hosted service is an electronic mail (email) service and wherein generating a pool of partial tenant objects comprises;
    generating, as a partial tenant object, a mailbox in the email service.

14. The computer implemented method of claim 13 wherein generating the mailbox in the email system comprises generating the mailbox with tenant placeholder information, and further comprising:
    binding the mailbox to the tenant-specific data by replacing the tenant placeholder information with tenant-specific identifier information on the mailbox based on the call to provision the new tenant.

15. The computer implemented method of claim 14 wherein generating the mailbox comprises generating the mailbox in the email system with domain placeholder information and wherein binding the mailbox to the tenant-specific data comprises:
    binding the mailbox to the tenant-specific data by replacing the domain placeholder information with tenant-specific domain information on the mailbox based on the call to provision the new tenant.

16. The computer implemented method of claim 15 wherein generating the mailbox comprises generating the mailbox in the email system with user placeholder information and wherein binding the mailbox to the tenant-specific data comprises:
    binding the mailbox to the tenant-specific data by replacing the user placeholder information with user-specific user information on the mailbox based on the call to provision the new tenant.

17. The computer implemented method of claim 16 wherein binding the mailbox to the tenant-specific data comprises:
    replacing the tenant placeholder information with the tenant-specific identifier information, the domain placeholder information with the tenant-specific domain information, and the user placeholder information with the user-specific user information, based on a single call to provision the new tenant.

18. The computer implemented method of claim 12 and further comprising:
    in response to receiving the call, through the API, to provision the new tenant, identifying a location where the new tenant is to be hosted; and
    re-routing the call to the identified location.

19. A computing system, comprising:
    at least one processor;
    memory storing instructions executable by the at least one processor, wherein the instructions, when executed, provide:
        hosted service logic that hosts a service for a plurality of different tenants and exposes an application programming interface that is called to provision a new tenant on the hosted service;
        partial tenant pool maintenance logic that generates a pool of partial tenant objects each mapped to a domain controller;
        partial tenant selection logic that selects a first partial tenant object, mapped to a first domain controller, from the pool of partial tenant objects, for binding to tenant-specific data, based on a call to provision the new tenant;
        failure detection logic that detects a failure in binding the tenant-specific data to the first partial tenant object;
        remapping logic that remaps the first partial tenant object to a different domain controller, other than the first domain controller, based on the failure detection, the partial tenant selection logic selecting a second partial tenant object, mapped to a second domain controller, for binding to the tenant-specific data during remapping of the first partial tenant object;
        replication logic configured to replicate the pool of partial tenant objects across a plurality of domain controllers.

20. The computing system of claim 19 wherein the instructions, when executed, provide:
    partial tenant activation logic configured to deactivate the first partial tenant object, so that it is not selectable by the partial tenant selection logic, while the remapping logic is remapping the first partial tenant object to the different domain controller and while the replication logic is replicating the remapping across the plurality of domain controllers.

* * * * *